United States Patent [19]

Matsubara et al.

[11] Patent Number: 5,438,090

[45] Date of Patent: * Aug. 1, 1995

[54] MASTERBATCH COMPOSITION FOR THERMOPLASTIC RESIN MODIFICATION AND METHOD FOR PREPARING SAID MASTERBATCH COMPOSITION

[75] Inventors: Saburo Matsubara; Yoshihiro Goushi, both of Yokohama, Japan

[73] Assignee: Nippon Oil Company, Ltd., Tokyo, Japan

[ * ] Notice: The portion of the term of this patent subsequent to May 29, 2007 has been disclaimed.

[21] Appl. No.: 501,415

[22] Filed: Mar. 27, 1990

Related U.S. Application Data

[63] Continuation of Ser. No. 301,358, Jan. 25, 1989, abandoned.

[30] Foreign Application Priority Data

Feb. 5, 1988 [JP] Japan ................................. 63-23843

[51] Int. Cl.$^6$ ............................ C08K 5/01; C08J 3/20
[52] U.S. Cl. ................................. 524/490; 523/351; 524/528; 525/240; 264/143
[58] Field of Search ............... 524/490, 528; 523/351; 525/240; 264/143

[56] References Cited

U.S. PATENT DOCUMENTS

| | | | |
|---|---|---|---|
| 3,694,524 | 9/1972 | Tinger et al. | 525/240 |
| 4,166,057 | 8/1979 | Takemori | 524/100 |
| 4,657,982 | 4/1987 | Breck et al. | 525/240 |
| 4,786,678 | 11/1988 | Dobreski et al. | 524/528 |
| 4,929,680 | 5/1990 | Matsubara et al. | 525/240 |

*Primary Examiner*—Paul R. Michl
*Assistant Examiner*—John J. Garriello
*Attorney, Agent, or Firm*—Schmeiser, Olsen & Watts

[57] ABSTRACT

A masterbatch composition for thermoplastic resin modification containing a polybutene and an ethylene-α-olefin copolymer obtained by copolymerizing ethylene with α-olefin in the presence of specific catalysts and characterized by specific properties, and a method for preparing the composition by kneading and extrusion at a temperature ranging from the maximum peak temperature (Tm) to (Tm-45)° C. in accordance with differential scanning calorimetry of the copolymer are disclosed.

Masterbatch pellets for thermoplastic resin modification having low surface tackiness can be obtained from the composition.

10 Claims, No Drawings

MASTERBATCH COMPOSITION FOR THERMOPLASTIC RESIN MODIFICATION AND METHOD FOR PREPARING SAID MASTERBATCH COMPOSITION

This application is a continuation of application Ser. No. 301,358, filed Jan. 25. 1989 now abandoned.

BACKGROUND OF THE INVENTION

1. Field of the Invention

The present invention relates to a masterbatch composition used for thermoplastic resin modification which has low tackiness and good workability and a method for preparing the masterbatch composition.

More particularly, it relates to a masterbatch composition comprising polybutene and an ethylene-α-olefin copolymer obtained by copolymerizing ethylene with an α-olefin and having specific characteristics, and to the method for preparing the masterbatch composition.

2. Description of the Prior Art

A variety of molded articles, sheets and films are prepared from thermoplastic resin by molding processes such as injection molding, extrusion molding, blow molding and inflation molding. The thermoplastic resin is generally blended with various kinds of liquid, solid or powdery modifiers, for example, plasticizers, fillers, dyestuffs, pigments, lubricants, antioxidants and other miscellaneous agents in order to provide the resin having characteristics required for each application. These modifiers are blended with the thermoplastic resin in advance, pelletized and used. Alternatively, masterbatch pellets having a higher content of the modifiers are previously prepared and used for molding after dry blending with the base resin. In particular, in case the modifiers are liquid, masterbatch pellets are widely prepared in advance and used after dry blending with the thermoplastic resin.

In case polybutenes are used for the above modifiers, masterbatch pellets having a higher polybutene content must be prepared. Polybutenes, however, cause the problems described below, because they are poorly compatible with other polyolefin resins: tackiness of the pellets increases either immediately after preparation or several days thereafter, due to bleeding of polybutene on the surface of the pellets; blocking of the pellets takes place with one another or bridging occurs in a hopper during the dry blending operation. As a result, the prescribed amount of polybutene cannot be blended or non-uniformity of the blended mixture results even though blending can be carried out. Thus, blending operations are very difficult.

SUMMARY OF THE INVENTION

An object of this invention is to provide a masterbatch composition for thermoplastic resin modification capable of preparing masterbatch pellets which can prevent bleeding phenomenon during storage for a long period of time and also to provide a method for preparing the masterbatch composition.

Another object of this invention is to provide a composition which has decreased blocking of pellets with one another, attains uniform dispersion in dry blending operation, can prevent bridging in the hopper and is hence capable of achieving stable molding operation, and also to provide a method for preparing the composition.

A further object of this invention is to provide a masterbatch composition which can be kneaded and extruded at lower temperatures and hence can reduce thermal degradation, and also to provide a method for preparing the composition.

A still further object of this invention is to provide a masterbatch composition which has high efficiency as a modifier by increasing the content of polybutene and also to provide a method for preparing the composition.

The above objects can be achieved by providing a masterbatch composition for thermoplastic resin modification comprising:

(A) 30–95 parts by weight of an ethylene-α-olefin copolymer obtained by copolymerizing ethylene with an α-olefin having 3–12 carbon atoms in the presence of a catalyst composed of an organic aluminum compound and a solid component containing at least magnesium and titanium, and characterized by the properties (I)–(IV):

(I) Melt index of 0.01–100 g/10 min, (II) Density of 0.860–0.910 g/cm$^3$, (III) Maximum peak temperature (Tm) of at least 100° C. in accordance with differential scanning calorimetry (DSC), and (IV) Boiling n-hexane insoluble matter of at least 10%; and (B) 5–70 parts by weight of a polybutene having a number average molecular weight of 300–4000.

The above objects can also be achieved by kneading and extruding the above masterbatch composition in the temperature range from the peak temperature (Tm) to (Tm-45)° C. in accordance with the differential scanning calorimetry (DSC).

DETAILED DESCRIPTION OF THE INVENTION

The present invention will be described in detail hereinafter. Ethylene-α-olefin Copolymer (A):

The ethylene-α-olefin copolymer used in this invention can be obtained by the copolymerization of ethylene with α-olefin in the presence of a catalyst composed of an organic aluminum compound and a solid component containing at least magnesium and titanium. An α-olefin having 3–12 carbon atoms can be used for this invention. Illustrative examples of α-olefin include propylene, butene-1, 4-methylpentene-1, hexene-1, octene-1, decene-1 and dodecene-1. A particularly preferred α-olefin has 3–6 carbon atoms and includes propylene, butene-1, 4-methylpentene-1 and hexene-1. Dienes such as butadiene and 1,4-hexadiene can also be used in combination with α-olefin as comonomers within the scope of this invention. The preferred α-olefin content of the ethylene-α-olefin copolymer is 5–40 mol %.

The catalyst system applied for this invention is obtained by combination of the organic aluminum compound with the solid catalyst component containing at least magnesium and titanium. The solid catalyst component includes, for example, the component obtained by supporting the titanium compound with a known process on an inorganic solid compound containing magnesium. Representative examples of the inorganic solid compound containing magnesium include: magnesium metal; magnesium hydroxide; magnesium oxide; magnesium salts such as magnesium carbonate and magnesium chloride; double salts, double oxides, carbonates, chlorides or hydroxides containing magnesium atoms and metals selected from silicon, aluminum and calcium; and further include the compounds obtained by treating or reacting these solid compounds with oxygen containing compounds, sulfur containing compounds, aromatic hydrocarbons or halogen containing materials.

Illustrative examples of the above oxygen containing compounds are water; oxygen containing organic compounds such as alcohol, phenol, ketone, aldehyde, carboxylic acid, ester, alkoxy silane, poly-siloxane and acid amide; and oxygen containing inorganic compounds such as metal alkoxides and metal oxychlorides. The sulfur containing compounds include, for example, sulfur containing organic compounds such as thiol and thioether, and sulfur containing inorganic compounds such as elemental sulfur dioxide, sulfur trioxide and sulfur. Aromatic hydrocarbons include, for example, various mono- and poly-aromatic hydrocarbon compounds such as benzene, toluene, xylene, anthracene and phenanthrene. Examples of halogen containing materials include, compounds such as chlorine, hydrogen chloride, metal chlorides and organic halogenides.

On the other hand, the titanium compound supported on the inorganic solid compound containing magnesium includes, for example, titanium halogenides, titanium alkoxy halogenides, titanium alkoxides and titanium oxyhalogenides. The preferred titanium compounds are tetravalent and trivalent titanium compounds.

The preferred tetravalent titanium compound is represented by the following formula:

$$Ti(OR)_n X_{4-n}$$

wherein R is an alkyl, aryl or aralkyl group having 1–20 carbon atoms, X is a halogen atom and n is 0 or an integer of 1–4.

Illustrative examples of the tetravalent titanium compound include titanium tetrachloride, titanium tetrabromide, titanium tetraiodide, monomethoxy(trichloro) titanium, dimethoxy (dichloro) titanium, trimethoxy (monochloro) titanium, tetramethoxytitanium, monoethoxy (trichloro) titanium, diethoxy (dichloro)-titanium, triethoxy(monochloro)titanium, tetraethoxytitanium, monoisopropoxy(trichloro)titanium, diisopropoxy(dichloro)titanium, triisopropoxy(monochloro)titanium, tetraisopropoxytitanium, monobutoxy(trichloro)titanium, dibutoxy(dichloro)titanium, monopentoxy(trichloro) titanium, monophenoxy(trichloro)titanium, diphenoxy(dichloro) titabium, triphenoxy(monochloro)-titanium and tetraphenoxy titanium.

The preferred trivalent titanium compound is a titanium trihalogenides such as titanium trichloride. Tetravalent titanium compounds are preferred among these titanium compounds and titanium tetrachloride is particularly preferred.

An example of other catalyst systems is a system obtained by using, as the solid catalyst component, a reaction product of the titanium compound with organic magnesium compounds such as the so-called Grignard reagent and by combining the reaction product with the organic aluminum compound.

The organic magnesium compounds which can be used are, for example, those having the following formulas:

$$RMgX, R_2Mg \text{ and } RMg(OR)$$

wherein R is an organic group having 1–20 carbon atoms and X is a halogen atom, ether complexes of these compounds, and substances obtained by further modifying these organic magnesium compounds with addition of various types of organic metal compounds such as organic sodium compounds, organic lithium compounds, organic potassium compounds, organic boron compounds, organic calcium compounds and organic zinc compounds.

Another example of other catalyst systems is a system obtained by using, as the solid catalyst component, a solid substance resulting from bringing inorganic oxides such as $SiO_2$ and $Al_2O_3$ into contact with the solid catalyst component containing at least magnesium and titanium, and by combining the solid substance with the organic aluminum compound. Inorganic oxides other than $SiO_2$ and $Al_2O_3$ include, for example, CaO, $B_2O_3$ and $SnO_2$. Double oxides of these-compounds can also be used without trouble. Known methods can be employed for carrying out the contact of these inorganic oxides with the solid catalyst component containing magnesium and titanium. For example, the oxides may be reacted with the solid catalyst component at a temperature of 20°–400° C., preferably 50°–300° C., usually for 5 minutes to 20 hours in the presence or absence of an inert solvent. The oxides and the catalyst component may be subjected to a co-grinding treatment. The reaction may also be conducted by suitably combining both procedures.

In these catalyst systems, the titanium compound may also be used in the form of an adduct with an organic carboxylic acid ester. The above inorganic solid compound containing magnesium may also be employed after subjecting to a contact treatment with the organic carboxylic acid ester. The organic aluminum compound may also be used without any trouble in the form of an adduct with the organic carboxylic acid ester or an organic silicon compound.

Illustrative examples of the organic aluminum compound to be combined with the above solid catalyst component are preferably represented by the following formulas:

$$R_3Al, R_2AlX, RAlX_2, R_2AlOR, RAl(OR)X \text{ and } R_3Al_2X_3$$

wherein R is an alkyl, aryl or aralkyl group of 1–20 carbon atoms, X is a halogen atom, and R may be the same or different. The organic aluminum compound includes, for example, triethylaluminum, triisobutylaluminum, trihexylaluminum, trioctylaluminum, diethylaluminum chloride, diethylaluminum ethoxide, ethylaluminum sesquichloride and mixtures of these compounds.

The organic aluminum compound may be used in any amount and usually in the range of 0.1 to 1000 mols per mol of the titanium compound.

In case the above catalyst systems are contacted with the α-olefin before polymerization, the activity of the polymerization sharply improves, with the result that the operation is more stable as compared with the case of non-contacting.

The polymerization reaction is carried out by the same procedures as in the polymerization reaction of olefin in the presence of a usual Ziegler type catalyst. For example, the reaction is conducted substantially in the absence of oxygen and water, and in the vapor phase or in the presence of an inert solvent or by using the monomer itself as the solvent.

Polymerization of olefin is carried out at a temperature of 20°–300° C., preferably at 40°–200° C. and in the pressure range from atmospheric pressure to 70 kgf/cm² preferably from 2 kgf/cm² to 60 kgf/cm². Although molecular weight of polymer can be controlled to some extent by changing polymerization conditions such as polymerization temperature and mole ratio of the catalyst, it is more effectively adjusted by the addition of hydrogen to the polymerization system. Two step or multi-step polymerization reactions under different polymerization conditions such as hydrogen concentration and polymerization concentration can of course be carried out without any trouble.

The ethylene-α-olefin copolymer (A) of this invention having specific properties is prepared by the above methods.

The ethylene-α-olefin copolymer used in this invention has a melt index (MI) of 0.01–100 g/10 min, preferably 0.1–50 g/10 min and more preferably 0.1–20 g/min. The melt index is measured at 190° C. under 2.16 kg load in accordance with JIS K-6760.

The copolymer has a density of 0.860–0.910 g/cm³ preferably 0.870–0.905 g/cm³ and more preferably 0.870–0.900 g/cm in accordance with JIS K-6760. The copolymer also has a maximum peak temperature (Tm) of at least 100° C., preferably 110°–130° C., and more preferably 115°–125° C. by differential scanning calorimetry (DSC). The content of boiling n-hexane insoluble matter in the copolymer is at least 10 wt.%, preferably 20–95 wt. %, and more preferably 20–90 wt. %.

When the MI of the ethylene-α-olefin copolymer (A) is less than 0.01 g/10 min, flowability of the copolymer becomes poor due to too low MI. On the other hand, when the MI exceeds 100 g/10 min, the masterbatch pellets become too soft and lead to surface tackiness.

When the density is less than 0.860 g/cm³, surface tackiness also generates on the pellets. When the density exceeds 0.910 g/cm³, the pellets become unstable and bleeding occurs during storage for a long period of time.

When the maximum peak temperature by DSC is less than 100° C., surface tackiness generates on the masterbatch pellets.

When the content of boiling n-hexane insoluble matter is less than 10 wt.%, tackiness also occurs on the surface of masterbatch pellets.

The ethylene-α-olefin copolymer (A) is preferably used in the form of powder or granule for preparing the composition of this invention.

Polybutene (B)

Polybutene (B) used in the present invention can be selected from a broad range of products depending upon its application. Polybutene (B) includes, for example, viscous polymers which are commonly obtained in the industry by removing butadiene from C₄-fraction of naphtha cracking, and polymerizing the resultant butane-butene fraction in the presence of acidic catalysts such as aluminum chloride, silica-alumina, cation exchange resin, and particularly Friedel-Crafts catalysts.

The number average molecular weight of the polybutene used in this invention is generally 300–4000 and preferably 400–3000. When the number average molecular weight is lower than this range, flash point of polybutene unfavorably decreases and a part of the polybutene tends to evaporate during an extended storage. When the number average molecular weight is higher than this range, polybutene becomes difficult to handle because of too high viscosity.

Component Proportion

In the masterbatch composition for thermoplastic resin modification of this invention, the proportion of ethylene. α-olefin copolymer (A) is 30–95 parts by weight, preferably 40–90 parts by weight, and more preferably 45–90 parts by weight. The proportion of polybutene (B) is 5–70 parts by weight, preferably 10–60 parts by weight and more preferably 10–55 parts by weight.

When the content of polybutene is lower than 5 parts by weight, an excessive amount of the masterbatch is required and hence efficiency of the masterbatch is decreased. When the content of polybutene exceeds 70 parts by weight, unfavorable tackiness generates on the surface of resultant masterbatch composition.

Preparation of the Masterbatch Composition for Thermoplastic Resin Modification The masterbatch composition for thermoplastic resin modification of this invention can be prepared by uniformly kneading the above ethylene-α-olefin copolymer and polybutene so as to obtain the prescribed component proportion, subsequently extruding the resultant mass and then conventionally pelletizing the extruded strands. Suitable known technology can be used in this process. Representative examples of the technology include a kneading and extrusion process using a single screw extruder or twin screw extruder. The kneading and extruding temperatures in the process is in the range from the maximum peak temperature Tm° C. to the temperature (Tm-45)° C. by DSC of the above ethylene-α-olefin copolymer, preferably from (Tm-5)° C. to (Tm-40)° C., and more preferably from (Tm-10)° C. to (Tm-30)° C. When the kneading and extruding temperature is higher than Tm, bleeding occurs on the surface of resulting pellets and tackiness also increases unfavorably. On the other hand, when the kneading and extruding temperature is lower than (Tm-45)° C., strength of the pellets themselves lowers or strands cannot be extruded and hence pelletizing becomes difficult. The ethylene-α-olefin copolymer and polybutene may be mechanically mixed prior to kneading or may be charged into the kneader at the same time or separately. When the mechanical premixing is carried out at a temperature exceeding Tm, the masterbatch pellets of this invention cannot, of course, be obtained.

Suitable known technology can also be employed for the pelletizing step of this invention. Representative examples of the technology include cold-cut process and hot-cut process. In the cold-cut process, the resin strands extruded under the above processing conditions are cooled in water or by air and successively cut into pellets with a pelletizer.

Conventionally known additives may be previously blended into the composition of this invention. These additives include, for example, plasticizers, fillers, dyestuffs, pigments, lubricants, antioxidants and tackifying resins such as aliphatic and aromatic petroleum resins, alicyclic petroleum resins, terpen resins, rosin and its derivatives.

The masterbatch composition for thermoplastic resin modification obtained by the method of this invention has excellent characteristics as described above and hence can be applied very widely:

The fields of application include, for example:

(a) Various packaging films (wrapping films, stretch films, agricultural films),
(b) Various kinds of sheets,
(c) Covering materials,
(d) Noise insulating materials, damping materials, sealants, waterproof materials,
(e) Foot gears, and
(f) Hoses, packings.

The masterbatch composition of this invention is used as additives such as modifiers for the thermoplastic resin employed in these fields.

Examples of the said thermoplastic resins include polyethylene, polypropylene, polystyrene, synthetic rubbers, polyvinylacetate, polyvinylalcohol, polyvinylacetal, polyacrylates, polyacrylic derivatives, polyacrylamide polyethers, polyvinylchloride, polyvinylidenechloride, polyacrylonitrile, polyfluoroethylenes, polyesters, polycarbonates, cellulose resins, polyamides, polyimides, polyamideimides and polysulfones.

EXAMPLES

This invention will hereinafter be illustrated in detail by way of examples. However, this invention is not limited to the specific embodiments.

Methods for Measuring Physical Properties Differential scanning calorimetry (DSC)

A film having a thickness of 100 μm was molded by a hot press and used for the sample. The sample was heated to 170° C., maintained at the temperature for 15 minutes and cooled to 0° C. at a cooling rate of 25° C./min. Measurement was started at this state and the sample was heated to 170° C. at a rate of 10° C./min. The maximum peak was selected from the peaks generated during the temperature rise from 0° C. to 170° C. The top position of the maximum peak was defined as the maximum peak temperature (Tm).

Measurement of boiling n-hexane insoluble matter

A sheet having a thickness of 200 μm was molded by a hot press and 3 sheets having dimensions of 200×300 mm were cut out of the molded sheet and used for specimens. The specimens were extracted with boiling n-hexane for 5 hours by using a double pipe Soxhlet extractor. The residue obtained was dried under vacuum at 50° C. for 7 hours and the content of boiling n-hexane insoluble matter ($C_6$ insoluble matter) was calculated from the following equation:

Boiling n-hexane insoluble matter (wt. %) =

$$\frac{\text{weight of sheet after extraction}}{\text{weight of sheet before extraction}} \times 100 \text{ (wt. \%)}$$

Tackiness of pellets

A strand having a length of about 50 mm was used as specimen. The specimen was inserted between 2 sheets of transparent polyester film having a thickness of 38 μm and lightly pressed with fingers. Marks of the strand remaining on the polyester film were evaluated by visual observation and divided into the following classes:
⊚: No tackiness (no marks remained at all)
○: Almost no tackiness (light marks remained)
△: Tackiness was somewhat present (marks remained to some extent).
X: Tackiness was present (marks completely remained).

Preparation of Ethylene-α-olefin Copolymer Sample

The ethylene-α-olefin copolymer components which were used in the examples and comparative examples [Components (A-1)–(A-3)] will be described below.

Preparation of components (A-1) and (A-2)

Ethylene-butene-1 copolymers (A-1) and (A-2) were prepared by copolymerizing ethylene with butene-1 in the presence of a catalyst consisting of triethylaluminum and a solid catalyst component derived from substantially anhydrous magnesium chloride, 1,2-dichloroethane and titanium tetrachloride.

Preparation of component (A-3)

Ethylene-propylene copolymer (A-3) was prepared by copolymerizing ethylene with propylene in the presence of a catalyst consisting of triethylaluminum and a solid catalyst component derived from substantially anhydrous magnesium chloride, anthracene and titanium tetrachloride.

Properties of these ethylene-α-olefin copolymer components are illustrated in Table 1.

EXAMPLES 1–9

Ethylene-α-olefin copolymer granules and polybutene which was previously warmed to 80° C. were separately fed by pumps from hoppers to a single screw extruder so as to obtain the compositions illustrated in Table 2. The extruder had a screw diameter of 20 mm, L/D ratio of 20, and die diameter of 2 mm, and was preheated to the extrusion temperature illustrated in Table 2. Kneading and extrusion were carried out at a revolution of 70 rpm to obtain strands. The strands thus obtained were then cooled with water and cut into pellets with a pelletizer.

In all cases of Examples 1–9, strands could be continuously extruded and pelletized with the pelletizer without any trouble. The resultant pellets had an extremely low tackiness. Results of property evaluation in these examples are summarized in Table 2.

COMPARATIVE EXAMPLES 1–2

The same procedures as described in the above examples were conducted in the extrusion tests by using the compositions and extrusion temperatures illustrated in Table 2. As a result, strands could be barely extruded in Comparative Example 1. The strands, however, were very tacky and poor in quality. In Comparative Example 2, the extruded strands were broken into pieces and continuous extrusion of strands could not be carried out.

Results of property evaluation on these compositions are summarized in Table 2.

COMPARATIVE EXAMPLES 3–4

Commercial low density polyethylene (LDPE) was used in place of ethylene-α-olefin copolymer granules. The same procedures as described in the Examples 1–9 were carried out by using the compositions and extrusion temperatures illustrated in Table 2. As a result, when the extrusion molding was carried out at a temperature generally used for the extrusion of LDPE as illustrated in Comparative Example 3, the strands could be barely extruded. The resultant strands, however, were extremely tacky. When it was intended to carry out the extrusion molding at the same temperature as used for extruding the composition of this invention as illustrated in Comparative Example 4, the extrusion was impossible. Results of property evaluation on these comparative examples are summarized in Table 2.

TABLE 1

| Component | Ethylene content (mol %) | Melt index (g/10 min) | Density (g/cm$^3$) | DSC max. peak (Tm) (°C.) | Boiling n-hexane insoluble matter (wt. %) |
|---|---|---|---|---|---|
| A-1 | 87.8 | 0.9 | 0.889 | 118.9 | 81 |
| A-2 | 92.0 | 5.0 | 0.906 | 122.1 | 93 |
| A-3 | 86.0 | 1.2 | 0.896 | 120.5 | 60 |

TABLE 2

| Example or Comparative Example | Component A | Polybutene** (Number average mol. wt.) | Tm (°C.) | Extrusion Temperature (°C.) | Evaluation of pellet tackiness Polybutene content (wt. %) | | | | |
|---|---|---|---|---|---|---|---|---|---|
| | | | | | 10 | 20 | 30 | 40 | 30 (after 2 months) |
| Ex.-1 | A-1 | 540 | 118.9 | 96 | ⊙ | ⊙ | ⊙ | ○ | ○ |
| Ex.-2 | A-1 | 970 | " | 95 | ⊙ | ⊙ | ⊙ | ○ | ○ |
| Ex.-3 | A-1 | 1,350 | " | 95 | ⊙ | ⊙ | ⊙ | ⊙ | ⊙ |
| Ex.-4 | A-2 | " | 122.1 | 102 | ⊙ | ⊙ | ⊙ | ○ | ⊙ |
| Ex.-5 | A-3 | " | 120.5 | 105 | ⊙ | ⊙ | ⊙ | ○ | ○ |
| Ex.-6 | A-1 | " | 118.9 | 85 | ⊙ | ⊙ | ⊙ | ○ | ○ |
| Ex.-7 | A-1 | " | " | 105 | ⊙ | ⊙ | ⊙ | ○ | ○ |
| Ex.-8 | A-3 | " | 120.5 | 80 | ○ | ○ | ○ | ○ | ○ |
| Ex.-9 | A-1 | " | 118.9 | 114 | ○ | ○ | ○ | ○ | ○ |
| Comp. Ex.-1 | A-1 | " | " | 135 | △ | X | X | X | X |
| Comp. Ex.-2 | A-3 | " | 120.5 | 70 | Strand extrusion was impossible. | | | | |
| Comp. Ex.-3 | *LDPE | " | 109 | 180 | X | X | X | X | X |
| Comp. Ex.-4 | " | " | 109 | 85 | Extraction was impossible. | | | | |

Note:
*Nisseki Rexlon: F-41 (product of Nippon Petrochemical Co., Ltd., Tm = 109° C.)
**Nisseki Polybutene: HV-15(540), HV-100(970), HV-300(1350) (product of Nippon Petrochemical Co., Ltd.)
( ) means number average molecular weight.

What is claimed is:

1. A method for preparing a masterbatch composition for thermoplastic resin modification which comprises kneading and extruding a component mixture at a temperature ranging from the maximum peak temperature (Tm) to (Tm-45)° C. in accordance with differential scanning calorimetry (DSC) of an ethylene-α-olefin copolymer, the component mixture comprising:

(A) 30-95 parts by weight of an ethylene-α-olefin copolymer obtained by copolymerizing ethylene with an α-olefin having 3-12 carbon atoms in the presence of a catalyst composed of an organic aluminum compound and a solid component containing at least magnesium and titanium, and characterized by the properties (I)-(IV):
   (I) Melt index of 0.01-100 g/10 min,
   (II) Density of 0.860-0.910 g/cm$^3$, (III) Maximum peak temperature (Tm) of at least 100° C. in accordance with differential scanning calorimetry (DSC), and
   (IV) Boiling n-hexane insoluble matter of at least 10%; and
   (B) 5-70 parts by weight of a polybutene having a number average molecular weight of 300-4000.

2. The method of claim 1 wherein the α-olefin of the ethylene-α-olefin copolymer (A) has 3-6 carbon atoms.

3. The method of claim 1 wherein the content of α-olefin in the ethylene-α-olefin copolymer (A) is 5-40 mol %.

4. The method of claim 1 wherein the ethylene-α-olefin copolymer (A) has a melt index of 0.1-50 g/10 min.

5. The method of claim 1 wherein the ethylene-α-olefin copolymer (A) has a density of 0.870-0.905 g/cm$^3$.

6. The method of claim 1 wherein the ethylene-α-olefin copolymer (A) has a Tm of 110°-130° C.

7. The method of claim 1 wherein the ethylene-α-olefin copolymer (A) has a boiling n-hexane insoluble matter of 20-95 wt.%.

8. The method of claim 1 wherein the polybutene (B) has a number average molecular weight of 400-3000.

9. The method of claim 1 comprising 40-90 parts by weight of the ethylene-α-olefin copolymer (A) and 10-60 parts by weight of the polybutene (B).

10. The method of claim 1 wherein the kneading and extruding is carried out at a temperature ranging from (Tm-5)° C. to (Tm-40)° C.

* * * * *